United States Patent [19]

Wild et al.

[11] Patent Number: 5,716,301
[45] Date of Patent: Feb. 10, 1998

[54] SYSTEM FOR DETERMINING A GEAR RATIO CHANGE FOR AN AUTOMATIC TRANSMISSION

[75] Inventors: Ernst Wild, Oberriexingen; Manfred Meissner, Marbach; Manfred Hellmann, Hardthof; Andrea Steiger-Pischke, Weissach; Dirk Samuelsen, Asperg; Karl-Heinz Senger, Loechgau; Wolfgang Hermsen, Rodgau, all of Germany

[73] Assignee: Robert Bosch GmbH, Stuttgart, Germany

[21] Appl. No.: 692,274

[22] Filed: Aug. 5, 1996

[30] Foreign Application Priority Data

Aug. 4, 1995 [DE] Germany .................. 195 28 625.1

[51] Int. Cl.$^6$ ............. F16H 59/60; F16H 59/62; G06F 19/00
[52] U.S. Cl. .......... 477/97; 364/424.027; 364/424.094; 477/901
[58] Field of Search .............. 477/97, 901; 364/424.027, 364/424.08, 424.094

[56] References Cited

U.S. PATENT DOCUMENTS

| | | |
|---|---|---|
| 4,679,145 | 7/1987 | Beeck et al. . |
| 4,982,359 | 1/1991 | Kamiyama et al. . |
| 5,025,684 | 6/1991 | Stehle et al. . |
| 5,146,219 | 9/1992 | Zechnall ............. 364/424.027 |
| 5,157,609 | 10/1992 | Stehle et al. . |
| 5,208,750 | 5/1993 | Kurami et al. ........ 364/424.027 |
| 5,315,295 | 5/1994 | Fujii . |
| 5,504,482 | 4/1996 | Schreder ............ 340/995 |
| 5,514,050 | 5/1996 | Bäuerle et al. . |
| 5,648,898 | 7/1997 | Moore-McKee et al. ... 364/424.034 X |
| 5,661,650 | 8/1997 | Sekine et al. ......... 364/424.027 |

FOREIGN PATENT DOCUMENTS

| | | |
|---|---|---|
| 3802337 | 7/1989 | Germany . |
| 4312717 | 11/1993 | Germany . |
| 4337163 | 5/1994 | Germany . |
| 2283353 | 5/1995 | United Kingdom . |

OTHER PUBLICATIONS

"Die Adaptive Getriebesteuerung für die Automatikgetriebe der BMW Fahrzeuge Zwölfzylindermotor" by Andreas Welter, et al. Automobiltechnische Zeitschrift 94 (1992) pp. 428–435.

"Die Adaptive Getriebesteuerung für BMW–Automobile" by Andreas Welter et al Automobiltechnische Zeitschrift 95 (1993) pp. 420–434.

"Electronics as your Copilot" by C. O'Malley, Popular Science, Sep. (1991), pp. 66 to 69.

Primary Examiner—Khoi Q. Ta
Attorney, Agent, or Firm—Walter Ottesen

[57] ABSTRACT

The invention is based on an adaptive transmission control wherein changes in the gear ratio of the automatic transmission are determined in dependence upon the detected position of the accelerator pedal actuated by the driver or variables associated therewith and in dependence upon the vehicle straight-line speed and/or the output rpm of the transmission and/or the motor rpm or variables associated therewith. Also, an adaptive variable is determined which adapts the changes of the transmission gear ratio at least to the driving situation then present. The essence of the invention is that the path data of a navigation system is used to determine the above-mentioned adaptation variable. The navigation system is a known map-supported navigation system. In this way, it is advantageously possible to precisely detect the present as well as future driving and environmental situations to which the vehicle is just then subjected or will be subjected in the near future. Accordingly, a very precise estimate of the then existing driving or environmental situation is obtained to which the vehicle is just then subjected or will be subjected in the near future. Shifting strategy can be adapted to these present and future driving situations.

9 Claims, 8 Drawing Sheets

5,716,301

SYSTEM FOR DETERMINING A GEAR RATIO CHANGE FOR AN AUTOMATIC TRANSMISSION

BACKGROUND OF THE INVENTION

In automatic transmissions, it is known to cause changes in the gear ratio of the transmission in dependence upon motor load and in dependence upon vehicle straight-line speed, that is, the speed of the vehicle in its direction of movement. In addition to these dependencies, it is furthermore known to adapt the gear ratio changes to the driving style of the driver and/or to the traffic situation or driving situation and/or to the environmental conditions to which the vehicle is, at the time, subjected. For this purpose, it is generally provided that in an automatic transmission (which has a gear ratio changeable in a stepwise manner), the upshift and downshift operations are made in accordance with shift characteristic lines in dependence upon the throttle flap angle and the vehicle straight-line speed. These shift characteristic lines can be displaced in dependence upon the recognized type of driver, on the detected driving situation or on the detected environmental situation; or, different shift characteristic lines can be selected. For transmissions, which are continuously adjustable with respect to gear ratio, the gear ratio changes are generally stored in the form of a characteristic field in dependence upon the driving speed and the motor load. Here too, by a change of the characteristic field, the adaptation can be achieved to the following: different types of drivers, different environmental conditions and/or different driving situations.

Such adaptive transmission controls are, for example, known from the following: U.S. Pat. Nos. 5,157,609; 5,025,684; and 5,514,050 as well as an article of A. Welter et al entitled "Die adaptive Getriebesteuerung für die Automatikgetriebe der BMW Fahrzeuge mit Zwölfzylindermotor" published in ATZ, No. 94 (1992) 9, starting at page 428; and the article of A. Welter et al entitled "Die adaptive Getriebesteuerung für BMW-Automobile" published in ATZ, No. 95 (1993) 9, starting at page 420. Thus, and for example, conclusions are drawn as to driving through a curve from the accelerator pedal actuated by the driver and the transverse acceleration acting on the vehicle. The transverse acceleration can either be detected directly utilizing sensors or it can be determined from the different rpms of the left and right wheels.

If driving through a curve is detected, it is known that upshift operations should be suppressed during the travel in a curve notwithstanding reduced motor load. Likewise, it is known to draw conclusions as to travel downhill from the increase in vehicle straight-line speed, the position of the accelerator pedal actuated by the driver and the non-actuated brakes. Furthermore, it is also known to detect stop-and-go traffic from sensor signals available on the vehicle and to then change the shifting strategy in correspondence thereto.

All of the above known driving situations, which lead to an adaptation of the gear ratio changes, have in common that they are only detected when the vehicle is already in these driving situations. An anticipated determination of these driving situations is however unobtainable with means known to the state of the art.

Furthermore, navigation means based on maps are known to the state of the art. Thus, and for example, U.S. Pat. No. 5,146,219 and the article of C. O'Mally entitled "Electronics as Your Copilot" published in Popular Science, September 1991, starting at page 66, disclose that, from satellite directional systems and stored maps, the precise position of the motor vehicle can be determined, on the one hand, and, on the other hand, the precise course of the road traveled by the vehicle can be analyzed. From U.S. Pat. No. 5,146,219, it is known that the map-supported navigation system provides the driver of a motor vehicle with safety-relevant information. Likewise, it is here described that the safety-relevant information of the road map-supported navigation system can be used as a position variable for controlling vehicle equipment.

SUMMARY OF THE INVENTION

It is an object of the invention to improve the functions of an adaptive transmission control with the data present in the map-supported navigation system.

The system of the invention is for determining gear ratio changes in an automatic transmission of a motor vehicle equipped with an accelerator pedal. The system includes: map-supported navigation means for detecting path data (I); forming means for receiving the path data (I) and for forming an adaptation variable (BZ) in dependence upon the path data (I); first sensor means for detecting the position (DKI) of the accelerator pedal actuated by the driver or variables associated therewith and for generating a first input signal representative thereof; second sensor means for detecting the vehicle straight-line speed (Vx) and/or the transmission output rpm and/or the motor rpm or variables associated therewith and for generating a second input variable representative thereof; and, means for determining gear ratio changes (SG) of the automatic transmission at least in dependence upon the adaptation variable (BZ) and in dependence upon at least the first and second input variables.

The invention proceeds from a system to determine the gear ratio changes for an automatic transmission of a vehicle. The determination of the gear ratio changes of the automatic transmission takes place in dependence upon at least a first input variable which represents the detected position of the accelerator pedal actuated by the driver of the vehicle or variables associated therewith. Furthermore, the determination of the gear ratio changes takes place in dependence upon a second input variable which represents: the detected vehicle straight-line speed and/or the transmission output rpm and/or the motor rpm or variables associated therewith. Furthermore, the determination of an adaptation variable is provided which adapts the gear ratio changes to at least the present driving situation.

The essence of the invention is that a map-supported navigation means known from the state of the art is provided to detect path data. This path data is then used to determine the above-mentioned adaptation variable. The path data is detected by the map-supported navigation system and by using this data, it is advantageously possible to precisely detect the instantaneous as well as, also the future driving or environmental situation to which the vehicle is just then subjected or in the immediate future. In this way, a precise estimate of the particular driving or environmental situation to which the vehicle is just then subjected or is subjected in the immediate future is provided and the shifting strategy can be adapted to this driving and environmental situation.

In an advantageous embodiment of the invention, it is provided that the path data of the map-supported navigation system represents at least the horizontal gradient and/or the vertical gradient of the roadway to be traveled by the vehicle within a specific time. From the evaluation of the horizontal gradient or the vertical gradient of the roadway traveled by the vehicle, it is possible to detect a descent or an ascent or a curve lying ahead of the vehicle in the driving direction.

In this way, a reliable activation of a curve program or downhill program, known from the state of the art, is realized with an adaptive transmission control.

Frequency of shifting is reduced and an optimal gear ratio change adapted to the driving or environmental situation is achieved with the reliable activation of the curve function or the downhill function. The already mentioned detection of a curve, which is driven through, from the horizontal gradient of the roadway can be done, for example, in such a manner that the actual vehicle straight-line speed is logically coupled to the horizontal gradient to estimate a future transverse acceleration of the vehicle. As a reaction to a detected curve, a change of the transmission gear ratio to a higher transmission gear ratio is advantageously prevented. The extent of this prevention can be selected from the future transverse acceleration determined as described above.

Furthermore, and according to the invention, an ascent or descent is detected starting from the vertical gradient and, a change of the transmission gear ratio to a higher transmission gear ratio is prevented as reaction to such an uphill/downhill travel. To detect the ascent, and in an advantageous embodiment, a variable is formed which represents the ascent of the roadway to be traveled and is compared to a threshold value. This embodiment affords the advantage that upshifting operations are prevented especially for downhill travel of the vehicle. Such upshifting operations lead to an unintended increase of the driving speed. Likewise, for uphill travel, unintended upshifting operations are suppressed by the detected ascent.

The map-supported navigation means can also provide path data from the above-mentioned horizontal and vertical gradients of the roadway. This data can be informative as to whether the vehicle is within a town or within a city or on a country road or on an expressway. An advantageous embodiment of the invention provides that the changes in gear ratio of the automatic transmission are made in dependence upon this data. In this way, and most importantly, other shifting characteristic fields are to be selected within a town or especially within a city than, for example, would be selected during overland travel or during travel on an expressway.

It is especially provided that, for a detected travel within a town or within a city, the gear ratio changes in the sense of lower motor rpms are made (early upshifting or early change to higher gear ratios) and/or accelerations from a rest position in the lowest transmission gear ratio are avoided. This affords the advantage that, within a city, requirements with respect to noise protection and air quality are taken into account by an early upshift operation. Only reduced driving powers are made use of during travel in thick traffic within a city. The second gear (or a gear ratio higher than the lowest gear ratio) is adequate for high-powered vehicles for an appropriate acceleration from a standstill.

In an advantageous embodiment of the invention, it is furthermore provided that the formation of the adaptation variable is made in dependence upon the signals of the map-supported navigation system in dependence upon directly or indirectly detected transverse accelerations acting on the vehicle and/or in dependence upon the accelerator pedal movements and vehicle straight-line speed. For this configuration, it is especially considered to logically couple the initially-mentioned adaptive transmission control systems from the state of the art with the transmission control system according to the invention such that a very reliable recognition of the driving or environmental situation present in each case is obtained. Based on the data from the map-supported navigation system, an anticipatory evaluation of the situation is obtained; whereas, by detecting the transverse accelerations acting on the vehicle and/or the accelerator pedal movements and/or the vehicle straight-line speed, these anticipatorily determined situations can be verified. Compared to the state of the art, such a system affords the advantage that, for example, to detect travel in a curve, the presence of an even slight transverse acceleration is sufficient if previously the evaluation of the navigation system has shown that a travel through a curve is to be expected.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
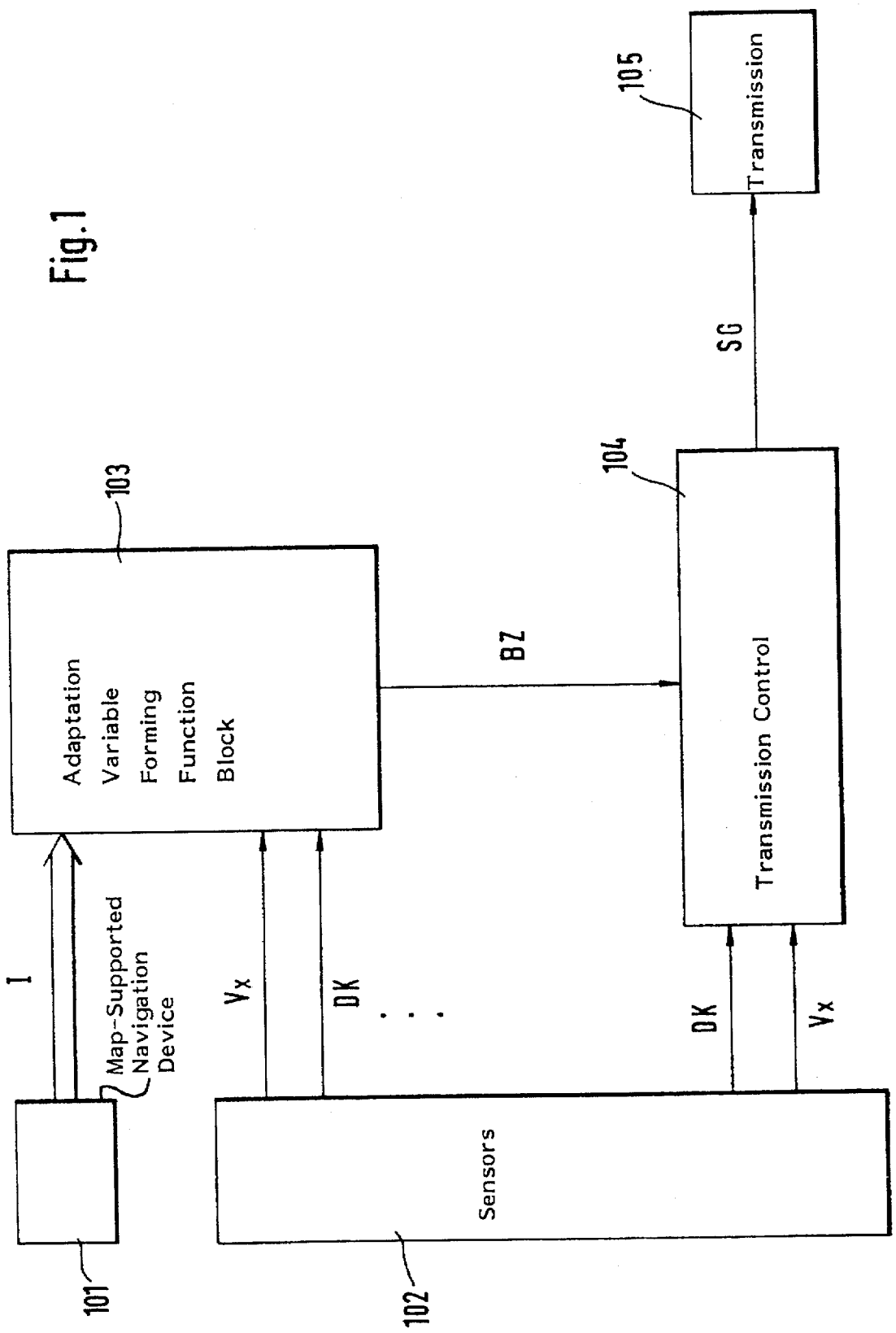
FIG. 1 is a block circuit diagram showing the system according to the invention.

In FIG. 1, reference numeral 102 identifies the sensors taken collectively. These sensors detect at least the following: the vehicle straight-line speed Vx and the position DK of the throttle flap or of the accelerator pedal actuated by the driver. A transmission control 104 transmits the desired gear ratio SG in dependence upon the motor load (throttle flap position DK) and the vehicle straight-line speed Vx to the transmission 105. At the transmission 105, the desired gear ratio SG leads to changes in the gear ratio. What is essential for the invention is that the transmission control 104 is configured so as to be adaptive. This means that the transmission performance (that is, the selection of the transmission gear ratios dependent upon the input variables) of the transmission control 104 can be changed by the adaptation variable BZ.

The reference numeral 101 identifies a map-supported navigation device which transmits the path data I to the unit 103. The adaptation variable BZ is formed by the unit 103 especially in dependence upon this path data I. The adaptation variable BZ is applied in the transmission control 104 to determine the gear ratio changes SG. In addition to the path data I of the navigation device 101, data of the sensors 102, such as the vehicle straight-line speed Vx and the motor load DK, can be considered in the formation of the adaptation variable BZ in specific embodiments of the invention.

Figure 2:
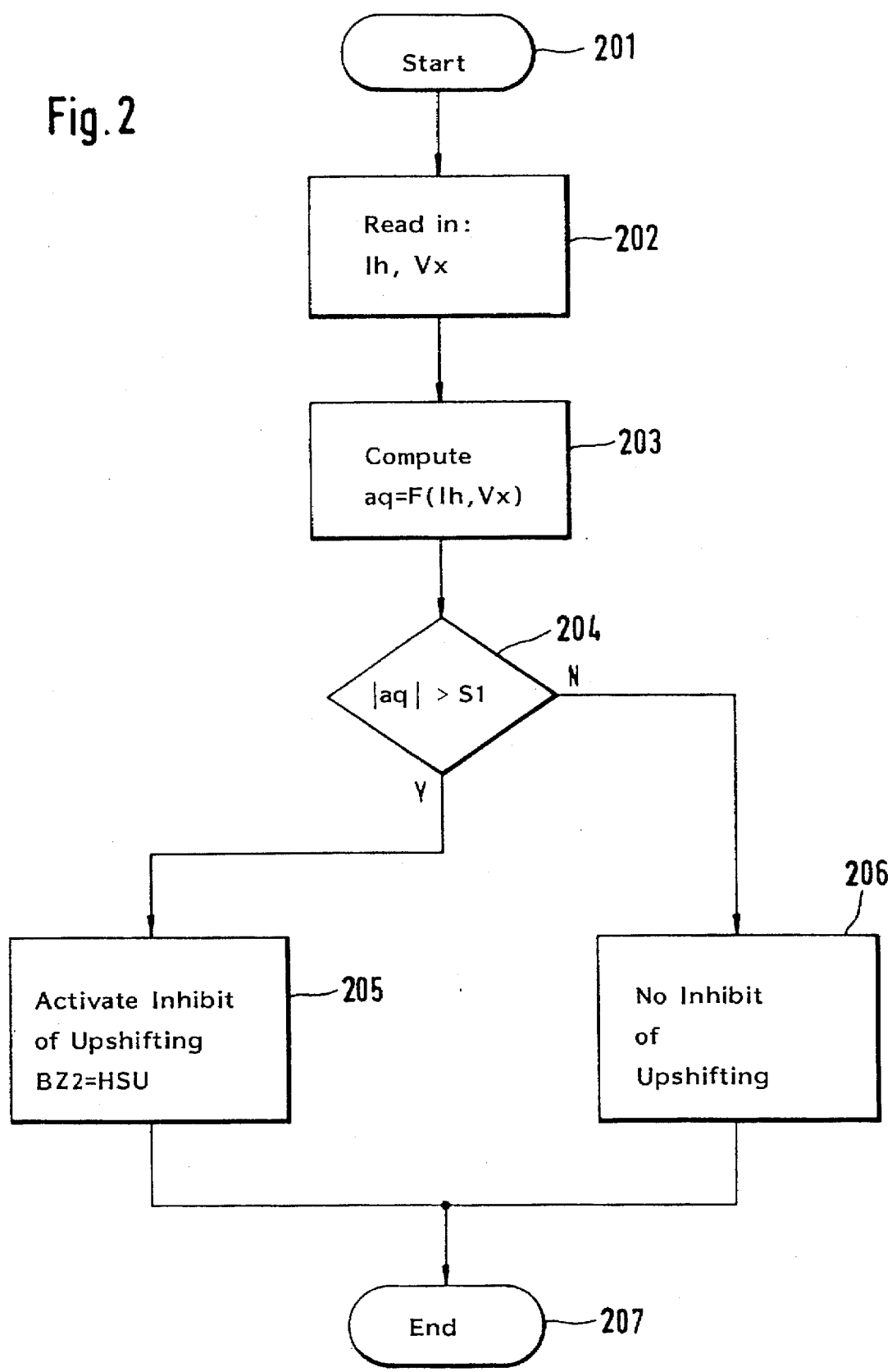
FIG. 2 shows a first embodiment of the invention with respect to curve recognition.
Figure 3:
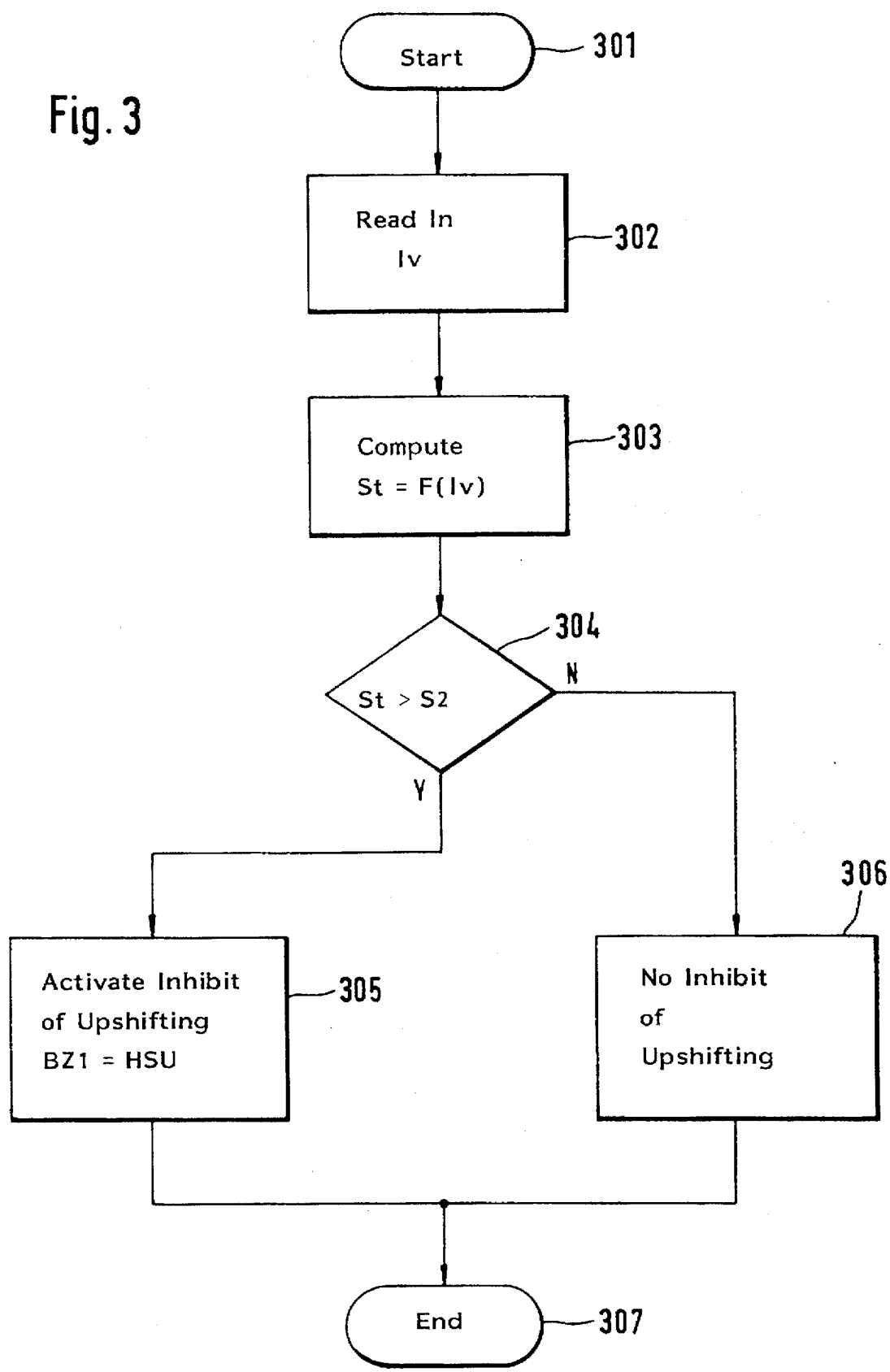
FIG. 3 is a second embodiment of the invention showing the recognition of downhill travel.

The embodiments of FIGS. 2 and 3 can be applied individually or in combination. These two embodiments have in common that the path data I mentioned with respect to FIG. 1 represent the course of the roadway to be traveled by the vehicle within a specific time. It is especially considered in these embodiments that the path data I represent, on the one hand, the horizontal gradient Ih and, on the other hand, the vertical gradient Iv of the roadway to be traveled by the vehicle within a specific time. To obtain this special path data Ih and Iv, it is essential that the navigation means 101 functions as a map-supported navigation means. As already described initially herein, such systems are known which, for example, determine the position of the vehicle from satellite bearings and compare this position to a stored map. From such a map-supported navigation, the precise position of the vehicle on the map is known as are the horizontal and vertical gradients of the roadway lying ahead of the vehicle.

In FIG. 2, after the start 201 and in step 202, the following are read in: the path data Ih, which represents the horizontal gradient of the roadway to be traveled, and the vehicle straight-line speed Vx. From this data, and in step 203, the transverse acceleration aq is computed which will occur during the drive on the roadway lying ahead of the vehicle. The transverse acceleration aq is provided, in a simple manner, as a function F of the horizontal gradient Ih, the roadway and the vehicle straight-line speed Vx.

In step 204, the future transverse acceleration, which can be anticipated, is compared to a threshold value S1. If the transverse acceleration drops below the value S1, then, in step 206, no inhibit of upshifting is activated. However, if the amount of the transverse acceleration exceeds the threshold value S1, then, in step 205, an upshift inhibit is activated. For this purpose, the adaptation variable BZ2 is set to the value HSU. At the end 207 of the program runthrough, step 201 is started anew.

The block 205 signifies that gear ratio changes toward long gear ratios are avoided until the program reaches block 206 because of the threshold value interrogation 204. Furthermore, it can be provided that, in block 205, an upshift inhibit is activated which prevents gear ratio changes to higher gear ratios within a specific time.

A reliable activation of the special curve shift program via the adaptation variable BZ2=HSU is possible with the embodiment of the invention shown in FIG. 2.

In the embodiment of FIG. 3 of the invention, and after the start 301, the vertical gradient Iv of the roadway lying ahead of the vehicle is read in in step 302. This requires as a precondition that a map is stored in the navigation means 101 which, in addition to the course of the roadway, also contains the topography, that is, the elevation gradients of the land. From the information Iv, the slope St of the roadway is computed in dependence upon the vertical gradient Iv in step 303.

In step 304, the slope St is compared to a threshold value S2. If the slope St is less than the threshold value S2, then, in step 306, no upshift inhibit is carried out. However, if the slope St exceeds the threshold value S2, then in step 305, the already-described upshift inhibit is activated. For this purpose, the adaptation variable BZ1=HSU is set. The program runthrough is started anew after the end 307.

With the embodiments of the invention shown in FIGS. 2 and 3, it has been shown by way of example, that the gear ratio changes can be adapted in an optimal manner to the driving situation by means of the recognition as to the upcoming roadway to be driven by the vehicle. The shifting operations of the automatic transmission come very close to the shift performance of a manual transmission actuated by the driver because the driver, with a manual transmission, adapts manual shifting operations in anticipation to the roadway conditions (curve and/or slope).

It is here noted that the driving situations "curve" and "downhill" are driving situations which are exemplary. In a conventional adaptive transmission control (which can, because of its sensors, only detect a driving situation when this driving situation has already been entered as least partially), the selected gear ratio changes can occur late under circumstances or erroneous estimates can be made.

Figure 4:
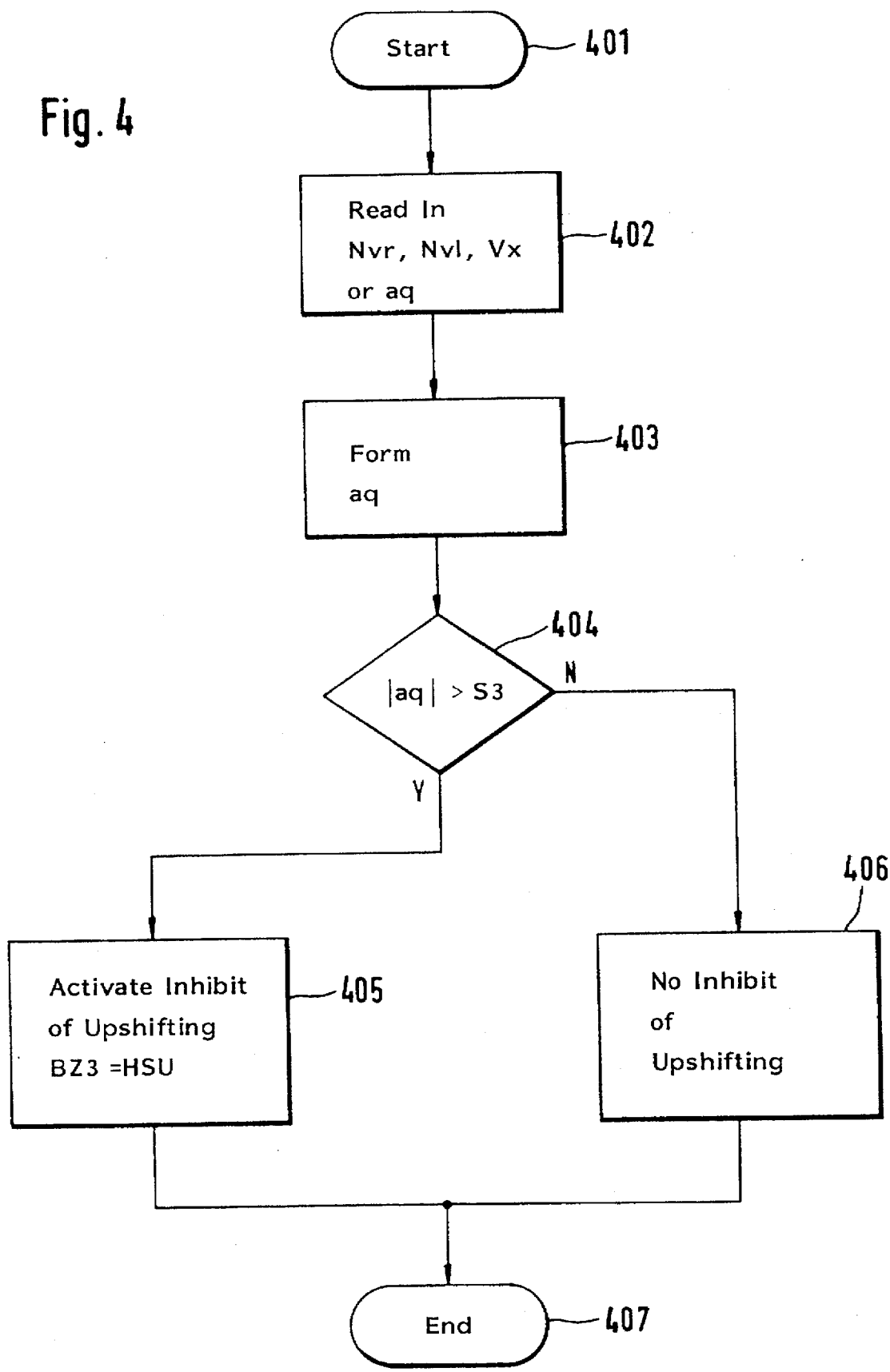
FIG. 4 shows a curve recognition according to the state of the art.
Figure 5:
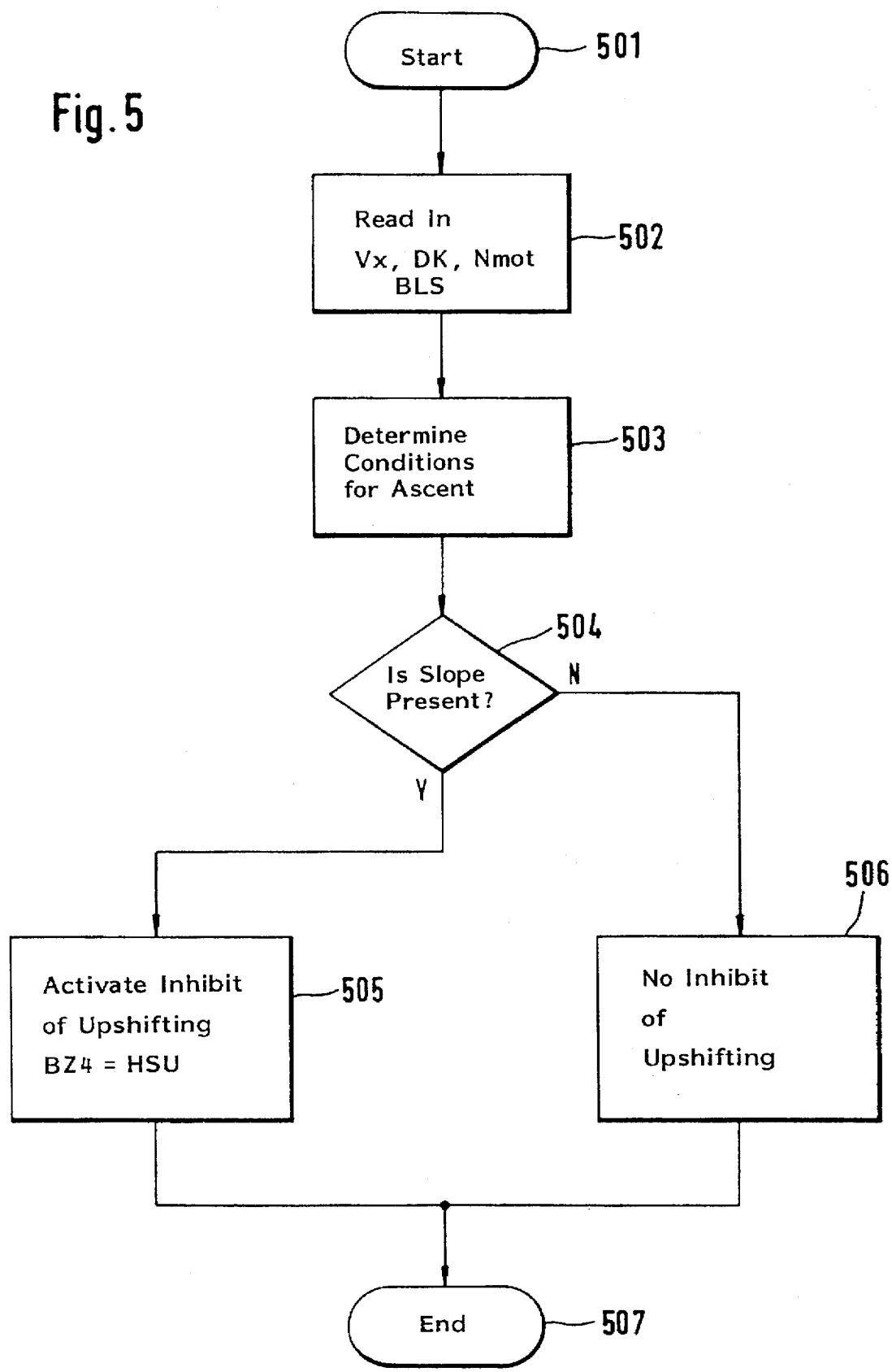
FIG. 5 is a flowchart showing the recognition of downhill travel according to the state of the art.
Figure 6:
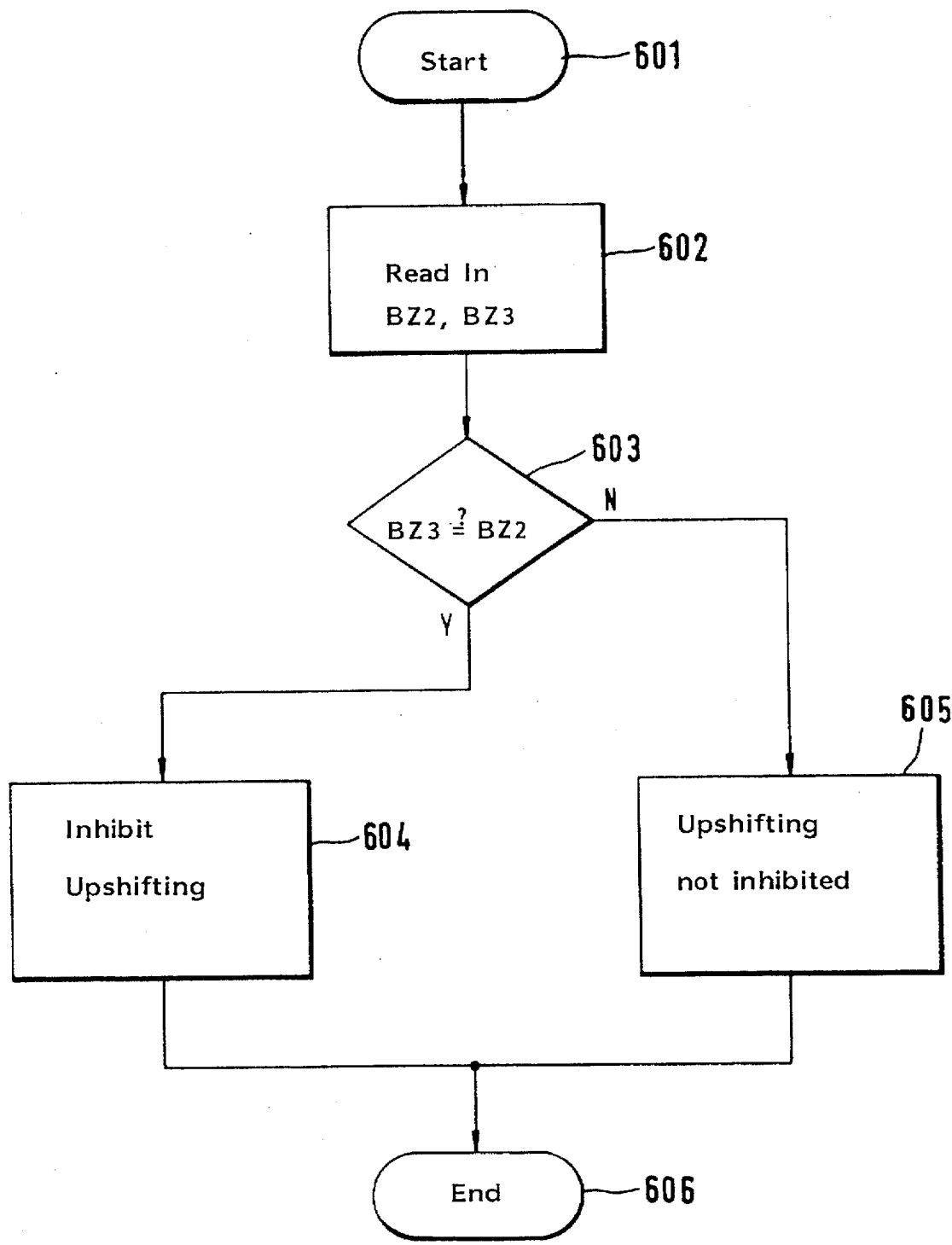
FIG. 6 is a flowchart showing the invention coupled to the procedure known from the state of the art.

In FIGS. 4, 5 and 6, and with reference to the sequence diagrams shown therein, it is shown how conventional detection of driving situations and anticipatory detection of driving situations can be connected in an advantageous manner because of the navigation system.

For this purpose, a curve travel and a downhill travel are determined as they are described in the state of the art with respect to FIGS. 4 and 5.

As shown in FIG. 4, and after the start 401, the following are read in in step 402: the wheel rpms Nvr and Nvl on the forward axis, the vehicle straight-line speed Vx or the instantaneous transverse acceleration aq. In step 403, the instantaneous transverse acceleration aq, which acts upon the vehicle, is determined from the difference of the wheel rpms of the right front wheel (Nvr) and the left front wheel (Nvl) and from the vehicle straight-line speed. If, in step 402, the transverse acceleration can be read in directly because of a transverse acceleration sensor, then the formation in step 403 is unnecessary. In step 404, the magnitude of the transverse acceleration is compared to a threshold S3. If the transverse acceleration just acting on the vehicle is below the threshold S3, then, in step 406, no upshift inhibit is effected. However, if the transverse acceleration exceeds the threshold S3, then, in step 405, the upshift inhibit is activated by setting the adaptation variable BZ3=HSU. The next runthrough is started after the runthrough is completed in step 407.

The procedure shown in FIG. 4 is known from the state of the art. This procedure utilizes the transverse acceleration acting during travel in a curve as an indicator for a curve drive. As described in the state of the art, it can be further provided that a curve drive is only then detected when the accelerator pedal is released with a specific rate of change before the transverse acceleration exceeds the threshold S3.

In FIG. 5, a downhill drive situation recognition is shown as known from the state of the art. After the start 501, the following are read in in step 502: the vehicle straight-line speed Vx, the throttle flap position DK, the motor rpm Nmot and the position BLS of the brake light switch. Specific conditions are interrogated by determination in step 503. These conditions permit a conclusion to be drawn as to a slope of the roadway. This takes place in accordance with the state of the art described herein initially and, for example, as described on page 435 of the above-mentioned article of A. Welter entitled "Die adaptive Getriebesteuerung für die Automatikgetriebe der BMW Fahrzeuge mit Zw ölfzylindermotor". Thus, a drive on a steep downhill roadway manifests itself in that the vehicle straight-line speed becomes greater when the accelerator pedal is unactuated. Furthermore, the actuation of the brake pedal can serve as a parameter.

In step 504, an interrogation is only made as to whether a slope such as a downhill drive is present. If this is not the case, then, in step 506, no upshift inhibit is made. However, if the vehicle does traverse a slope, then an upshift inhibit is activated in step 505. For this purpose, the adaptation variable BZ4=HSU is set. After end step 507, the program shown in FIG. 5 is started anew. The embodiment shown in FIG. 5 can be expanded as shown in the state of the art to include a downshift measure for very steep downhill roadways.

Figure 7:
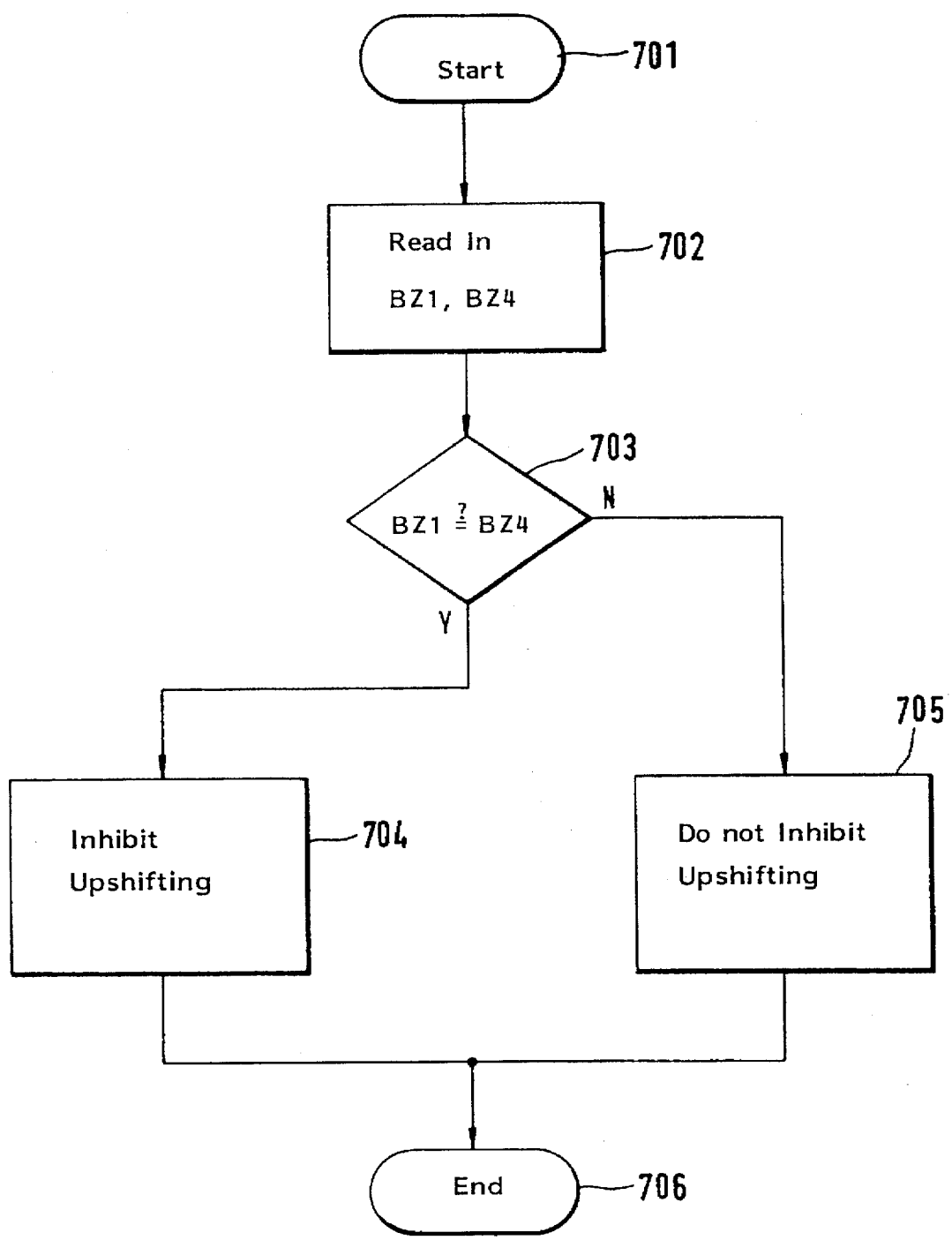
FIG. 7 is a flowchart showing the invention coupled to the procedure known from the state of the art; and, FIG. 8 is a flowchart showing the adaptation of the shift strategy during a city drive according to another embodiment of the invention.

FIGS. 6 and 7 will now describe schematically how the adaptation variables (BZ1 and BZ2) determined according to the invention are compared to the conventionally determined adaptation variables (BZ3 and BZ4) in order to obtain a very reliable decision as to whether an upshift inhibit is to be made or not.

After the start step 601, the adaptation variables BZ2 (determined according to the invention) and BZ3 (determined according to the state of the art) are read in. In step 603, the adaptation variable BZ3 is compared to the adaptation variable BZ2. If both show the value HSU, then, in step 604, the mode "upshift inhibit" is activated. If one or both of the reference variables in step 603 do not show the value HSU, then upshifting is not inhibited (step 605). After the end 606, the program runthrough shown in FIG. 6 is started anew.

The program sequence shown if FIG. 7 corresponds to that shown in FIG. 6 in the case wherein the adaptation variables BZ1 and BZ4, which are compared in FIG. 6, represent the presence of a slope.

Figure 8:
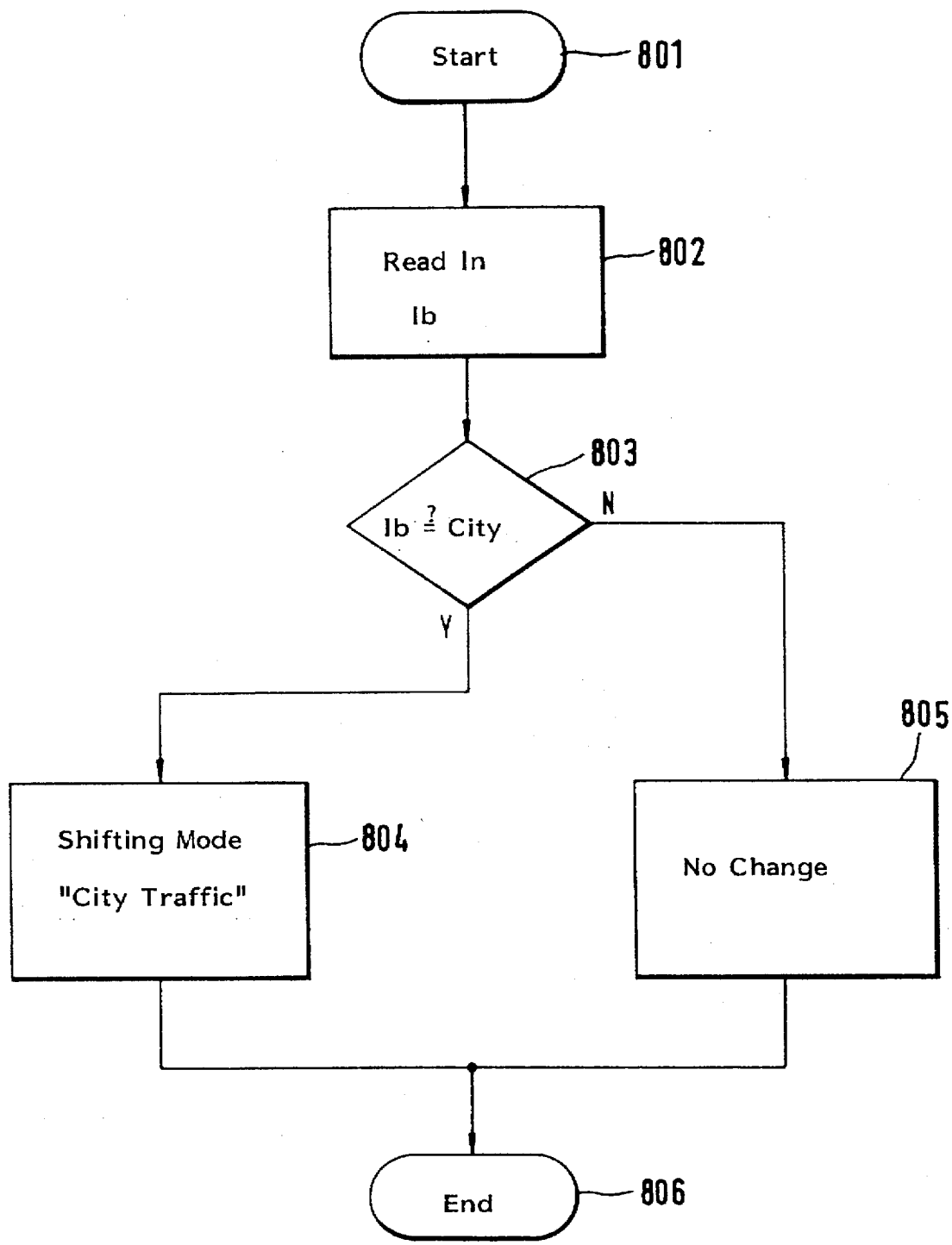

In FIG. 8, after the start 801 and in step 802, the path data Ib of the map-supported navigation means 101 is read in. The signal Ib represents whether the vehicle is in a city or not. The data as to whether a city drive is present or not can, for example, be made dependent upon the size of the city (for example, the number of inhabitants), the density of the buildings and/or the usual traffic density. This data can be taken from the map which is the basis of the navigation means.

The data "city drive" can therefore be obtained from the connection to a satellite bearing and a map. If, in step 803, the signal Ib indicates that a city trip is present, then, in step 804, the adaptation variable BZ can be so formed that the transfer function of the transmission control 104 is changed. This means that the gear ratio changes, which are dependent upon the input signals DK and Vx, are modified. This, for example, takes place because of a displacement or change of the shift characteristic lines or shift characteristic fields or via a selection of a specific shift characteristic line or shift characteristic field. If the signal Ib indicates in step 803 that no city drive is present, then the adaptation variable BZ is formed in step 805 in such a manner that the transfer function of the transmission control 104 remains unchanged.

As already mentioned, for the adaptation of the shift performance in step 804, it is especially considered that during a city trip, the gear ratio changes are made in the sense of a reduced motor rpm (early upshift or early change to higher gear ratios) and/or acceleration from standstill operations in the lowest transmission gear ratio is avoided. This affords the advantage that, within a city, requirements with respect to noise protection and air quality can be taken into account by an early upshift. Only reduced driving powers are demanded for driving within dense traffic within a city. In such situations, for example, the second gear (or a higher gear ratio than the lowest gear ratio) is sufficient in vehicles having powerful engines for an appropriate acceleration from standstill.

As described with respect to FIGS. 6 and 7, for the "curve-recognition" and for the "uphill/downhill-recognition", the shifting strategy "city traffic" can be selected especially by a logic coupling of signals Ib (from the map-supported navigation system) and a known "stop-and-go recognition". With this stop-and-go recognition, a detection is made as to when the throttle flap angle and the road speed remain below specific limits for a specific time. If these conditions for stop-and-go operation are present and the signal Ib at the same time signalizes "city operation", then the gear ratio adjustment strategy, which is optimal for such driving operation, is pursued.

As described with respect to FIG. 8, a check can be made as to whether the vehicle is on a country road or on an expressway, whereupon corresponding shifting strategies are selected. Furthermore, it can be provided that data as to traffic tips (for example, noise protection), traffic rules (for example, road speed) or traffic prohibitions (for example, speed limits) can be contained in the path data I. Upon detecting this data, the transfer function of the transmission control 104 can be matched to the detected data.

It is understood that the foregoing description is that of the preferred embodiments of the invention and that various changes and modifications may be made thereto without departing from the spirit and scope of the invention as defined in the appended claims.

What is claimed is:

1. A system for controlling gear ratio changes in an automatic transmission of a motor vehicle equipped with an accelerator pedal, the system comprising:

map-supported navigation means for detecting path data (I);

first sensor means for detecting the position (DKI) of said accelerator pedal actuated by the driver and for generating a first input variable representative thereof;

second sensor means for detecting at least one of a vehicle straight-line speed (Vx), the transmission output rpm and the motor rpm or variables associated therewith and for generating a second input variable representative thereof; and, forming means for receiving path data (I), said first input variable and said second input variable and for forming an adaptation variable (BZ) in dependence upon said path data, said first variable and said second variable; and, means for determining gear ratio changes (SG) of said automatic transmission at least in dependence upon one of said adaptation variable (BZ), said first input and said variable second input variables.

2. The system of claim 1, wherein said path data (I) represents at least a horizontal gradient (Ih) and a the vertical gradient (Iv) of the roadway to be driven over by said vehicle within a predetermined time.

3. The system of claim 2, wherein when a curve to be driven through is recognized based on said horizontal gradient (Ih), and, said determining means inhibited a change to a higher transmission gear ratio as a response to a recognized curve.

4. The system of claim 3, wherein the actual vehicle straight-line speed (Vx) is supplied to said forming means in addition to said horizontal gradient (Ih); a variable (aq) is determined as a function of said horizontal gradient (Ih) to said actual vehicle straight-line speed (Vx); said variable (aq) representing a future transverse acceleration of said vehicle; and, a change of the transmission gear ratio to a higher transmission gear ratio is inhibited by said determining means in dependence upon a comparison of said variable (aq) to a threshold value (S1).

5. The system of claim 2, wherein an upward slope to be driven up is recognized based on said vertical gradient (Iv); and, a change of the transmission gear ratio to a higher transmission gear ratio is inhibited by said determining means at least for a specific time.

6. The system of claim 5, wherein a variable (St) is formed, which represents the roadway to be driven over by the vehicle, to recognize a slope from said vertical gradient (Iv); and, a change of the transmission gear ratio to a higher gear ratio is inhibited by said determining means in dependence upon a comparison of said variable (St) to a threshold value (S2).

7. The system of claim 1, wherein said path data (I) represents whether said vehicle is located:

(a) within a town or within a city; or, (b) on a country road; or, (c) on an expressway; and, on the basis of said data (I), the gear ratio changes (SG) of said automatic transmission are determined by said determining means.

8. The system of claim 7, wherein when said path data (I) represents travel within a town or within a city is recognized, said determining means controlling said automatic transmission such that transmission gear ratio changes are made early to effect lower motor speeds or controlling said transmission such that starting of movement operations in the lowest gear ratio are avoided.

9. The system of claim 3, wherein the change of the transmission gear ratio to a higher transmission gear ratio is inhibited by said determining means as a function a transverse acceleration, which acts on said vehicle, upon movements of said accelerator pedal and road speed.

* * * * *

UNITED STATES PATENT AND TRADEMARK OFFICE
CERTIFICATE OF CORRECTION

PATENT NO. : 5,716,301
DATED : February 10, 1998
INVENTOR(S) : Ernst Wild, Manfred Meissner, Manfred Hellmann, Andrea Steiger-Pischke, Dirk Samuelsen, Karl-Heinz Senger and Wolfgang Hermsen It is certified that error appears in the above-identified patent and that said Letters Patent is hereby corrected as shown below:

In column 8, starting at line 19: delete claim 1 and substitute therefor the following:

-- 1. A system for controlling gear ratio changes in an automatic transmission of a motor vehicle equipped with an accelerator pedal, the system comprising:

map-supported navigation means for detecting path data (I);

first sensor means for detecting the position (DKI) of said accelerator pedal actuated by the driver for generating a first input second sensor means for detecting at least one of a vehicle straight-line speed (Vx), transmission output rpm and motor rpm and for generating a second input variable representative thereof;

forming means for receiving path data (I), said first input variable and said second input variable and for forming an adaptation variable (BZ) in dependence upon said path data, said first variable and said second variable; and, means for determining gear ratio changes (SG) of said automatic transmission at least in dependence upon one of said adaptation variable (BZ), first input variable and said second input variables.

UNITED STATES PATENT AND TRADEMARK OFFICE
CERTIFICATE OF CORRECTION

PATENT NO. : 5,716,301
DATED : February 10, 1998
INVENTOR(S) : Ernst Wild, Manfred Meissner, Manfred Hellmann, Andrea Steiger-Pischke, Dirk Samuelsen, Karl-Heinz Senger and Wolfgang Hermsen It is certified that error appears in the above-identified patent and that said Letters Patent is hereby corrected as shown below:

In column 8, line 43:   delete "the".

In column 8, line 48:   delete "(Ih)," and substitute -- (Ih); -- therefor.

In column 8, line 48:   delete "inhibited" and substitute -- inhibits -- therefor.

In column 8, line 54:   delete "to" and substitute -- and -- therefor.

In column 10, line 6:   delete "of movement".

In column 10, line 10:  between "function" and "a", insert --of --.

Signed and Sealed this

Twentieth Day of April, 1999

Attest:

Q. TODD DICKINSON

*Attesting Officer*     *Acting Commissioner of Patents and Trademarks*